(12) United States Patent
Dey

(10) Patent No.: US 6,801,506 B1
(45) Date of Patent: *Oct. 5, 2004

(54) METHOD AND APPARATUS FOR PROVIDING FAST SPANNING TREE RE-STARTS

(75) Inventor: Ashish K. Dey, Fremont, CA (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/283,111

(22) Filed: Mar. 31, 1999

(51) Int. Cl.[7] .............................................. H04L 12/28
(52) U.S. Cl. ...................................................... 370/256
(58) Field of Search ................................ 370/254–256, 370/389, 400–401, 408; 709/220–222, 239, 242; 714/21

(56) References Cited

U.S. PATENT DOCUMENTS

| 4,922,486 | A | | 5/1990 | Lidinsky et al. ............... 370/60 |
| 5,018,137 | A | * | 5/1991 | Backes et al. ............... 370/401 |
| 5,138,615 | A | | 8/1992 | Lamport et al. ............ 370/94.3 |
| 5,150,360 | A | | 9/1992 | Perlman et al. ............ 370/94.3 |
| 5,280,480 | A | | 1/1994 | Pitt et al. ................. 370/85.13 |
| 5,684,796 | A | * | 11/1997 | Abidi et al. ................. 370/389 |
| 5,740,171 | A | | 4/1998 | Mazzola et al. ............. 370/392 |
| 5,742,604 | A | | 4/1998 | Edsall et al. ................. 370/401 |
| 5,764,636 | A | * | 6/1998 | Edsall .......................... 370/256 |
| 5,790,808 | A | | 8/1998 | Seaman .................. 395/200.53 |
| 5,878,232 | A | * | 3/1999 | Marimuthu .................. 709/249 |
| 5,959,968 | A | * | 9/1999 | Chin et al. ................... 370/216 |
| 6,032,194 | A | * | 2/2000 | Gai et al. ...................... 340/2.1 |
| 6,202,114 | B1 | * | 3/2001 | Dutt et al. .................... 710/311 |
| 6,262,977 | B1 | * | 7/2001 | Seaman et al. .............. 370/254 |
| 6,327,251 | B1 | * | 12/2001 | Bion ........................... 370/255 |
| 6,330,229 | B1 | * | 12/2001 | Jain et al. .................... 370/256 |
| 6,621,818 | B1 | * | 9/2003 | Szczepanek et al. ........ 370/389 |

OTHER PUBLICATIONS

D. Delaney and M. Seaman, *Single or Multiple Filtering Databases*, May 8, 1997.

(List continued on next page.)

*Primary Examiner*—Seema S. Rao
*Assistant Examiner*—Kevin C. Harper
(74) *Attorney, Agent, or Firm*—Cesari and McKenna, LLP

(57) ABSTRACT

The invention relates to a method and apparatus for rapidly re-starting a spanning tree process at an intermediate device. A spanning tree entity running one or more instances of a spanning tree process or protocol stores a record of spanning tree parameter information and port states in a non-volatile memory. Following a re-start, the spanning tree entity verifies whether the parameter information in the non-volatile memory is still valid. If so, the spanning tree entity adopts the port states and the intermediate device resumes forwarding messages accordingly. If the spanning tree parameter information from the non-volatile memory is no longer valid, the spanning tree entity discards it and proceeds to re-calculate the spanning tree and transition its port states in a conventional manner.

26 Claims, 9 Drawing Sheets

OTHER PUBLICATIONS

S. Horowitz, *Dual–Layer Spanning Tree*, (A Spanning Tree Proposal for IEEE 802.1Q) May 14, 1997.

Lucent Technologies Inc.'s Initial Disclosure of Prior Art Under Civil Local Rule 16–7, U.S. District Court for the Northern District of California, C.A. No. C98–20836JW (PVT) ENE, Nov. 18, 1998.

M. Seaman, *High Availability Spanning Tree*, Rev. 1.1, Oct. 26, 1998.

J. Hart, *Extending the IEEE 802.1 MAC Bridge Standard to Remote Bridges*, IEEE Network, Jan. 1998, vol. 2, No. 1, pp. 10–15.

B. Yener et al., *Fault–Tolerant Convergence Routing*, Copyright 1994 IEEE.

R. Perlman, *Interconnections: Bridges and Routers*, Copyright 1992 by Addison Wesley Publishing Company, Inc, pp. 54–64.

IEEE P802.1d Draft Standard for Local Area Networks MAC (Media Access Control) Bridges: Technical and Editorial Corrections, Copyright 1997 IEEE, pp. 1–10, 85–122 and 151–158.

* cited by examiner

332

| SPANNING TREE PORT DATA STRUCTURE | |
|---|---|
| INTERFACE HANDLE | 602 |
| INTERFACE HANDLE HASH TABLE POINTER | 604 |
| PORT LINK | 606 |
| SPANNING TREE INSTANCE | 608 |
| INTERFACE/PORT PHYSICAL STATE | 610 |
| SPANNING TREE PORT STATE | 612 |
| PORT TYPE | 614 |
| ROOT BRIDGE IDENTIFIER (ID) | 616 |
| DESIGNATED BRIDGE IDENTIFIER (ID) | 618 |
| DESIGNATED BRIDGE PORT IDENTIFIER (ID) | 620 |
| BPDU MESSAGE PENDING FLAG | 622 |
| PORT PRIORITY | 624 |
| PORT NUMBER | 626 |
| PORT PATH COST | 628 |
| PORT FAST FLAG | 630 |
| HOLD TIMER | 632 |
| MAXIMUM AGE TIMER | 634 |
| FORWARD DELAY TIMER | 636 |
| BPDU MESSAGES IN | 638 |
| BPDU MESSAGES OUT | 640 |

FIG. 6

METHOD AND APPARATUS FOR PROVIDING FAST SPANNING TREE RE-STARTS

CROSS-REFERENCE TO RELATED APPLICATIONS

This application is related to the following co-pending U.S. patent applications:

U.S. patent application Ser. No. 08/997,297 entitled, SHARED SPANNING TREE PROTOCOL, filed Dec. 23, 1997;

U.S. patent application Ser. No. 08/998,412 entitled, FAST RECONFIGURATION OF SPANNING TREES, filed Dec. 24, 1997; and U.S. patent application Ser. No. 09/208,175 entitled VALUE-ADDED FEATURES FOR THE SPANNING TREE PROTOCOL, filed Dec. 9, 1998, each of which is assigned to the assignee of the present application.

FIELD OF THE INVENTION

The present invention relates generally to computer networks, and more specifically, to a method and apparatus for quickly identifying and selecting loop-free topologies in computer networks.

BACKGROUND OF THE INVENTION

A computer network typically comprises a plurality of interconnected entities. An entity may consist of any device, such as a computer or end station, that "sources" (i.e., transmits) or "sinks" (i.e., receives) data frames. A common type of computer network is a local area network ("LAN") which typically refers to a privately owned network within a single building or campus. LANs typically employ a data communication protocol (LAN standard), such as Ethernet, FDDI or token ring, that defines the functions performed by the data link and physical layers of a communications architecture (i.e., a protocol stack). In many instances, several LANs may be interconnected by point-to-point links, microwave transceivers, satellite hook-ups, etc. to form a wide area network ("WAN") or intranet that may span an entire country or continent.

One or more intermediate network devices are often used to couple LANs together and allow the corresponding entities to exchange information. For example, a bridge may be used to provide a "bridging" function between two or more LANs. Alternatively, a switch may be utilized to provide a "switching" function for transferring information between a plurality of LANs or end stations. Typically, the bridge or switch is a computer and includes a plurality of ports that couple the device to the LANs or end stations. Ports used to couple switches to each other are generally referred to as a trunk ports, whereas ports used to couple a switch to LANs or end stations are generally referred to as access ports. The switching function includes receiving data from a sending entity at a source port and transferring that data to at least one destination port for forwarding to the receiving entity.

Switches and bridges typically learn which destination port to use in order to reach a particular entity by noting on which source port the last message originating from that entity was received. This information is then stored by the bridge in a block of memory referred to as a filtering database. Thereafter, when a message addressed to a given entity is received on a source port, the bridge looks up the entity in its filtering database and identifies the appropriate destination port to reach that entity. If no destination port is identified in the filtering database, the bridge floods the message out all ports, except the port on which the message was received. Messages addressed to broadcast or multicast addresses are also flooded.

Additionally, most computer networks are either partially or fully meshed. That is, they include redundant communications paths so that a failure of any given link or device does not isolate any portion of the network. The existence of redundant links, however, may cause the formation of circuitous paths or "loops" within the network. Loops are highly undesirable because data frames may traverse the loops indefinitely. Furthermore, because switches and bridges replicate (i.e., flood) frames whose destination port is unknown or which are directed to broadcast or multicast addresses, the existence of loops may cause a proliferation of data frames that effectively overwhelms the network.

Spanning Tree Algorithm

To avoid the formation of loops, most bridges and switches execute a spanning tree algorithm which allows them to calculate an active network topology that is loop-free (i.e., a tree) and yet connects every pair of LANs within the network (i.e., the tree is spanning). The Institute of Electrical and Electronics Engineers (IEEE) has promulgated a standard (the 802.1D standard) that defines a spanning tree protocol to be executed by 802.1D compatible devices. In general, by executing the IEEE spanning tree protocol, bridges elect a single bridge to be the "root" bridge. Since each bridge has a unique numerical identifier (bridge ID), the root is typically the bridge with the lowest bridge ID. In addition, for each LAN coupled to more than one bridge, only one (the "designated bridge") is elected to forward frames to and from the respective LAN. The designated bridge is typically the one closest to the root. Each bridge also selects one port (its "root port") which gives the lowest cost path to the root. The root ports and designated bridge ports are selected for inclusion in the active topology and are placed in a forwarding state so that data frames may be forwarded to and from these ports and thus onto the corresponding paths or links of the network. Ports not included within the active topology are placed in a blocking state. When a port is in the blocking state, data frames will not be forwarded to or received from the port. A network administrator may also exclude a port from the spanning tree by placing it in a disabled state.

To obtain the information necessary to run the spanning tree protocol, bridges exchange special messages called configuration bridge protocol data unit (BPDU) messages. FIG. 1 is a block diagram of a conventional BPDU message 100. The BPDU message 100 includes a message header 102 compatible with the Media Access Control (MAC) layer of the respective LAN standard. The message header 102 comprises a destination address (DA) field 104, a source address (SA) field 106, and a Service Access Point (SAP) field 108, among others. The DA field 104 carries a unique bridge multicast destination address assigned to the spanning tree protocol. Appended to header 102 is a BPDU message area 110 that also contains a number of fields, including a root identifier (ROOT ID) field 112, a root path cost field 114, a bridge identifier (BRIDGE ID) field 116, a port identifier (PORT ID) field 118, a message age (MSG AGE) field 120, a maximum age (MAX AGE) field 122, a hello time field 124, and a forward delay (FWD DELAY) field 126, among others. The root identifier field 112 typically contains the identifier of the bridge assumed to be the root and the bridge identifier field 116 contains the identifier of the bridge sending the BPDU. The root path cost field 114 contains a value representing the cost to reach the assumed root from the port on which the BPDU is sent and the port identifier field 118 contains the port number of the port on which the BPDU is sent.

Upon start-up, each bridge initially assumes itself to be the root and transmits BPDU messages accordingly. Upon receipt of a BPDU message from a neighboring device, its contents are examined and compared with similar information (e.g., assumed root and lowest root path cost) stored by the receiving bridge in non-recoverable memory. If the information from the received BPDU is "better" than the stored information, the bridge adopts the better information and uses it in the BPDUs that it sends (adding the cost associated with the receiving port to the root path cost) from its ports, other than the port on which the "better" information was received. Although BPDU messages are not forwarded by bridges, the identifier of the root is eventually propagated to and adopted by all bridges as described above, allowing them to select their root port and any designated port(s).

In order to adapt the active topology to failures, the root periodically (e.g., every hello time) transmits BPDU messages. The hello time utilized by the root is also carried in the hello time field 124 of its BPDU messages. The default hello time is 2 seconds. In response to receiving BPDUs on their root ports, bridges transmit their own BPDUs from their designated ports, if any. Thus, every two seconds BPDUs are propagated throughout the bridged network, confirming the active topology. As shown in FIG. 1, BPDU messages stored by the bridges also include a message age field 120 which corresponds to the time since the root instigated the generation of this BPDU information. That is, BPDU messages from the root have their message age field 120 set to "0". Thus, every hello time, BPDU messages with a message age of "0" are propagated to and stored by the bridges.

After storing these BPDU messages, bridges proceed to increment the message age value every second. When the next BPDU message is received, the bridge examines the contents of the message age field 120 to determine whether it is smaller than the message age of its stored BPDU message. Assuming the received BPDU message originated from the root and thus has a message age of "0", the received BPDU message is considered to be "better" than the stored BPDU information (whose message age has presumably been incremented to "2" seconds) and, in response, the bridge proceeds to re-calculate the root, root path cost and root port based upon the received BPDU information. The bridge also stores this received BPDU message and proceeds to increment its message age field 120. If the message age of a stored BPDU message reaches a maximum age value, the corresponding BPDU information is considered to be stale and is discarded by the bridge.

Normally, each bridge replaces its stored BPDU information every hello time, thereby preventing it from being discarded and maintaining the current active topology. If a bridge stops receiving BPDU messages on a given port (indicating a possible link or device failure), it will continue to increment the respective message age value until it reaches the maximum age threshold. The bridge will then discard the stored BPDU information and proceed to re-calculate the root, root path cost and root port by transmitting BPDU messages utilizing the next best information it has. The maximum age value used within the bridged network is typically set by the root, which enters the appropriate value in the maximum age field 122 of its transmitted BPDU messages. Neighboring bridges similarly load this value in their BPDU messages, thereby propagating the selected value throughout the network. The default maximum age value under the IEEE standard is twenty seconds.

As BPDU information is up-dated and/or timed-out and the active topology is re-calculated, ports may transition from the blocking state to the forwarding state and vice versa. That is, as a result of new BPDU information, a previously blocked port may learn that it should be in the forwarding state (e.g., it is now the root port or a designated port). Rather than transition directly from the blocking state to the forwarding state, ports transition through two intermediate states: a listening state and a learning state. In the listening state, a port waits for information indicating that it should return to the blocking state. If, by the end of a preset time, no such information is received, the port transitions to the learning state. In the learning state, a port still blocks the receiving and forwarding of frames, but received frames are examined and the corresponding location information is stored in the filtering database, as described above. At the end of a second preset time, the port transitions from the learning state to the forwarding state, thereby allowing frames to be forwarded to and from the port. The time spent in each of the listening and the learning states is referred to as the forwarding delay and is entered by the root in field 126.

As ports transition between the blocked and forwarding states, entities may appear to move from one port to another. To prevent bridges from distributing messages based upon incorrect information, bridges quickly age-out and discard the "old" information in their filtering databases. More specifically, upon detection of a change in the active topology, bridges transmit Topology Change Notification Protocol Data Unit (TCN-PDU) frames toward the root. The format of the TCN-PDU frame is well known (see IEEE 802.1D standard) and, thus, will not be described herein. The TCN-PDU is propagated hop-by-hop until it reaches the root which confirms receipt of the TCN-PDU by setting a topology change flag in all BPDUs subsequently transmitted by the root for a period of time. Other bridges, receiving these BPDUs, note that the topology change flag has been set, thereby alerting them to the change in the active topology. In response, bridges significantly reduce the aging time associated with their filtering databases which, as described above, contain destination information corresponding to the entities within the network. Specifically, bridges replace the default aging time of 5 minutes with the forwarding delay time, which by default is fifteen seconds. Information contained in the filtering databases is thus quickly discarded.

Although the spanning tree protocol is able to maintain a loop-free topology despite network changes and failures, re-calculation of the active topology can be a time consuming and processor intensive task. For example, re-calculation of the spanning tree following an intermediate device crash or failure can take approximately thirty seconds. In particular, a crash or failure typically wipes out the BPDU information stored by a bridge. Upon re-start, the bridge assumes itself to be the root, places all of its ports in the listening state and proceeds to transmit BPDU messages accordingly. It thus takes approximately thirty seconds for a bridge to recover from a crash or failure (e.g., fifteen seconds in the listening state and another fifteen seconds in the learning state). During this time, message delivery is often delayed as ports transition between states, because ports in the listening and learning states do not forward or receive messages. Such delays can have serious consequences on time-sensitive traffic flows, such as voice or video streams.

Furthermore, short duration failures or crashes of the spanning tree protocol at a given bridge is not an infrequent problem. For example, failures or crashes can occur due to power fluctuations, glitches in the running of the spanning tree protocol software modules, glitches running other bridge processes that cause the spanning tree protocol to fail, etc. Even if a bridge or just the spanning tree protocol is only "down" for a few seconds and thus no change in port states may be warranted, re-calculation of the spanning still requires on the order of thirty seconds. Accordingly, significant time is wasted re-calculating the spanning tree following re-starts, even though no change in network topology has occurred and the ports are ultimately returned to their original states.

SUMMARY OF THE INVENTION

It is an object of the present invention to provide a method and apparatus for enhancing the operation of the spanning tree protocol in computer networks.

It is a further object of the present invention to provide a method and apparatus for providing fast spanning tree re-starts following intermediate device or software failures or crashes.

It is a still further object of the present invention to provide a method and apparatus for determining whether pre-crash port state information is still valid.

Briefly, the invention relates to a method and apparatus for rapidly re-starting a spanning tree protocol. According to the invention, a spanning tree entity running one or more instances of a spanning tree protocol stores a record of spanning tree parameter information and port states in a non-volatile memory. The entity may be operating at an intermediate network device having a plurality of ports. Following a re-start, the spanning tree entity verifies whether the parameter information in the non-volatile memory is still valid. If so, the spanning tree entity adopts the corresponding port states and the intermediate device resumes forwarding messages accordingly. If the spanning tree parameter information in the non-volatile memory is no longer valid, the spanning tree entity discards it along with the port states and proceeds to re-calculate the spanning tree and to transition its port states in a conventional manner. Thus, in situations where the spanning tree entity is re-started before any change in port states is warranted, the network device is able to resume the forwarding of messages without having to spend any time recalculating the spanning tree.

In the preferred embodiment, the spanning tree entity includes at least one state machine engine configured to transition the ports of the device among a plurality of states. In addition, the spanning tree entity records the state of each port and certain parameter information per instance of the spanning tree protocol in one or more novel spanning tree data structures stored at the non-volatile memory. In particular, for each instance of the spanning tree protocol, the spanning tree data structures contain at least the identifier for the root, the identifier of the root port and the root path cost. Furthermore, for each port per spanning tree instance, the data structures also contain at least the port state, the identifier of the designated bridge and designated bridge port and the root path cost from the designated bridge port. To verify the spanning tree parameter information stored at the non-volatile memory following a re-start, the spanning tree entity transmits test bridge protocol data unit (BPDU) messages from each port in order to trigger the receipt of reply BPDU messages from its neighboring devices. The entity then compares the contents of the received BPDU messages with the spanning tree parameters in the spanning tree data structures. If the information matches, then the entity "knows" that no change in its port states is warranted. If the compared information conflicts, then the entity discards the stored information and proceeds to re-calculate the spanning tree in a conventional manner.

In another aspect of the invention, the network device also includes a filtering database for associating network entity addresses with destination ports. In response to an impending crash or failure, the spanning tree entity places a time stamp in the non-volatile memory as one of its last acts before crashing or failing. Upon re-start, the entity examines the time stamp and compares it with the current time to thereby determine how long the entity was down. If the entity was down longer than the time that a root bridge would leave a Topology Change Notification (TCN) flag set in its BPDU messages, the entity realizes that it may have missed a topology change. In response, the entity causes the filtering database to shorten its age-out time so as to quickly discard possibly stale information. If the entity determines that it was down for a period of time less than the time for which TCN flags would remain set, the entity leaves the age-out time associated with the filtering database unchanged.

BRIEF DESCRIPTION OF THE DRAWINGS

The above and further advantages of the invention may be better understood by referring to the following description in conjunction with the accompanying drawings, in which:

FIG. 6 is a highly schematic diagram of a preferred spanning tree port data structure.

DETAILED DESCRIPTION OF THE PREFERRED EMBODIMENT

Figure 2:
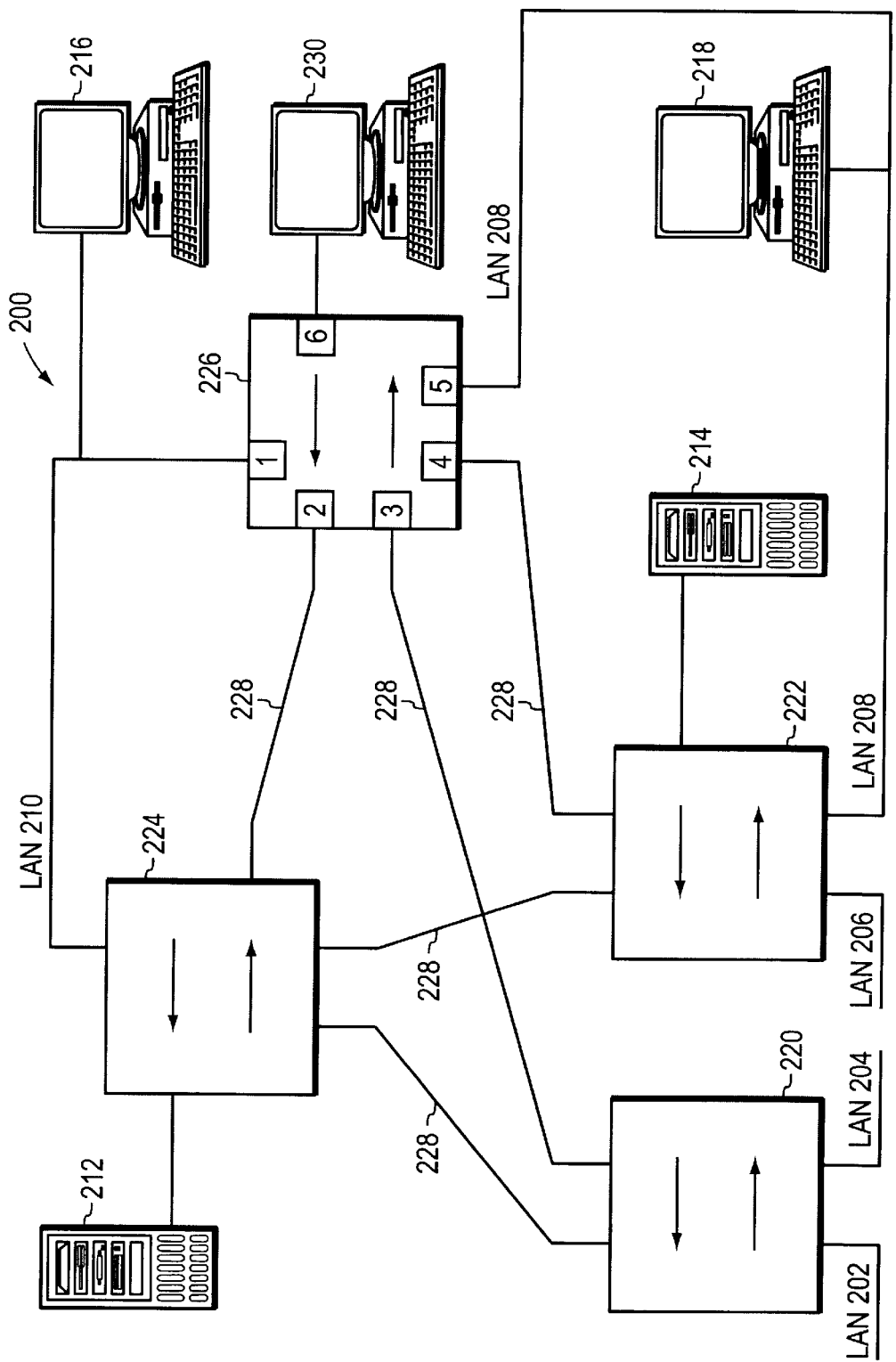
FIG. 2 is a highly schematic diagram of a computer network in accordance with the present invention.

FIG. 2 illustrates a computer network 200 in accordance with the present invention. The network 200 preferably comprises a plurality of local area networks (LANs) 202–210 and servers 212, 214, such as file servers, print servers, etc. Attached to the LANs 202–210 are one or more hosts or end stations, such as end stations 216, 218, that may source or sink data frames over the network 200. That is, LANs 202–210 and servers 212, 214 are preferably coupled to one or more intermediate network devices, such as switches 220–226. An end station, such as end station 230, may also be connected directly to a switch, such as switch 226. Switches 220–226, in turn, may be interconnected through a series of links 228, such as point-to-point links or trunks. More specifically, each switch 220–226 includes a plurality of ports that are coupled to corresponding LANs, servers, end stations and trunk links, and each port, such as the ports at switch 226, may be identified by a corresponding port number (e.g., port 1, port 2, port 3, etc.) Switches 220–226 are thus able to associate their specific ports with the LANs, switches, servers, etc. that are coupled thereto or otherwise accessible through a given port.

It should be understood that the network 200 of FIG. 2 is meant for illustrative purposes only and that the present invention will operate with other, possibly far more complex, network designs having multiple network components, such as end stations, servers, LANs, bridges, switches, routers, gateways, etc.

As shown, network 200 includes a plurality of redundant communication paths. The existence of such redundant paths prevents portions of the network 200 from becoming isolated should any constituent link or intermediate network device fail. Such redundancy, however, also results in the creation of loops, which, as described above, are highly undesirable. To avoid the creation of loops, switches 220–226 preferably execute a spanning tree protocol. However, as described herein, the spanning tree protocol executed by switches 220–226 preferably includes a fast re-start aspect to improve network performance.

Figure 3:
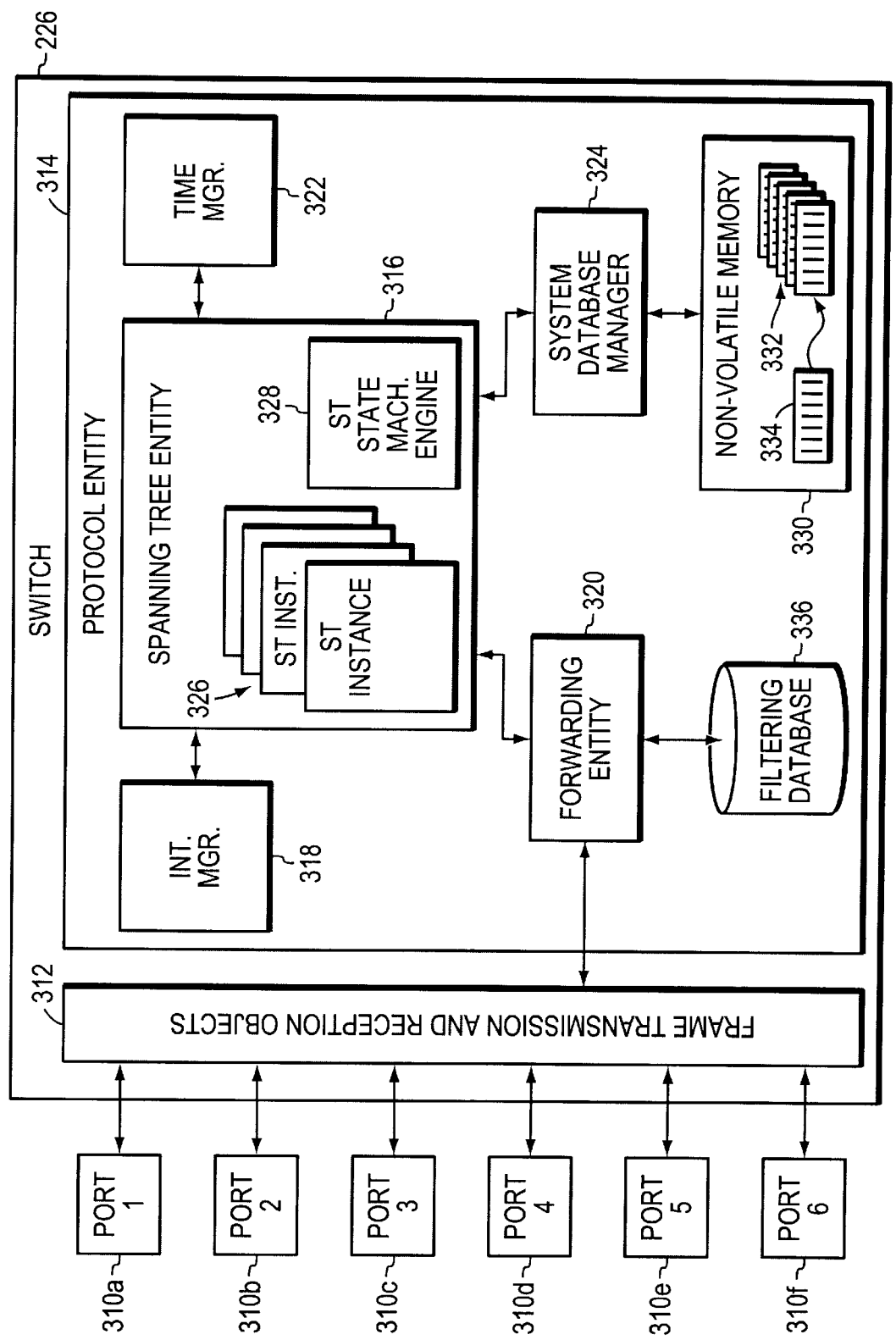
FIG. 3 is a partial block diagram of an intermediate network device in accordance with a preferred embodiment of the present invention.

FIG. 3 is a partial block diagram of switch 226 in accordance with the present invention. Switch 226 includes a plurality of ports 310a–310e each of which is preferably identified by a number (e.g., port numbers 1 through 6). One or more frame transmission and reception objects, designated generally 312, are associated with the ports 310 such that messages or frames received at a given port 310 may be captured and messages or frames to be transmitted by switch 226 may be delivered to a given port 310. Frame reception and transmission objects 312 are preferably message storage structures, such as priority queues.

Switch 226 further includes a protocol entity 314 comprising a plurality of components. In particular, the protocol entity 314 includes a spanning tree entity 316, an interface (INT) manager (MGR) 318, at least one forwarding entity 320, a timer manager 322 and a system database manager 324. The spanning tree entity 316, moreover, is in communicating relationship with the interface manager 318, the forwarding entity 320, the time manager 332 and the system database manager 324. Executing at the spanning tree entity 316 are one or more instances of a spanning tree (ST) process or protocol 326. Entity 316 also includes one or more spanning tree state machine engines 328 configured to transition ports 310 among a plurality of spanning tree states, including blocking, listening, learning and forwarding.

A non-volatile memory 330 is coupled to the system database manager 324. As described below, at least one novel data structure is stored at the non-volatile memory 330. Preferably, a plurality of data structures are stored at memory 330. First, a separate spanning tree port data structure 332 is preferably stored at memory 330 for each port 310 per instance of the spanning tree protocol 326 running at entity 316. Second, a separate spanning instance data structure 334 is stored for each instance 326 of the spanning tree protocol running at entity 316. In a conventional manner, non-volatile memory 330 also stores the unique, numeric bridge identifier (ID) for device 226, the assigned path cost corresponding to each port 310a–e and the default hello time, maximum age and forward delay parameters, among other parameters, to be utilized by device 226 upon initialization and if it is elected to be the root bridge.

It should be understood that the spanning tree entity 316 may also be coupled to a corresponding dynamic or volatile memory (not shown) through system database manager 324 or otherwise include a dynamic memory for storing spanning tree information or parameters associated with each instance of the spanning tree protocol 326 in a conventional manner.

The forwarding entity 320, moreover, is coupled to the frame transmission and reception objects 312 so as to receive messages captured from ports 310. Forwarding entity 320 is also coupled to a filtering database 336 that stores address information corresponding to the entities of network 200 (FIG. 2). Specifically, filtering database 336 has a plurality of records or cells (not shown), including a destination address cell, a destination port cell and a corresponding timer cell. Each record or cell in the filtering database 336 preferably corresponds to a particular network entity. The forwarding entity 320 is configured to switch or bridge messages and frames from a source port 310 to one or more destinations ports 310 depending on information contained in the forwarding database 336 and also on the states of the respective ports 310 as managed by the state machine engine 328. Forwarding entity 320 also relays BPDU messages between ports 310 and the spanning tree entity 316 with which it is in communicating relation.

In the illustrated embodiment, device 226 may be a switch having transmitting and receiving circuitry and components, including one or more network interface cards (NICs), establishing ports for the exchange of data frames, one or more central processing units (CPUs) and associated memory devices for performing calculations and one or more bus structures. A suitable switch for use with the present invention is the Catalyst 5000 series of switches from Cisco Systems, Inc.

It will be understood to those skilled in the art that non-volatile memory 330 may be a static random access memory (SRAM) device and that spanning tree entity 316 may comprise registers and combinational logic configured and arranged to produce sequential logic circuits. In the illustrated embodiment, entity 316 preferably comprises programmable processing elements containing software programs pertaining to the methods described herein and executable by the processing elements. Other computer readable media may also be used to store and execute the program instructions of the present invention.

In operation, the spanning tree entity 316 formulates configuration bridge protocol data unit (BPDU) messages for transmission on ports 310a–e, processes received BPDU messages from neighboring devices and stores BPDU parameters generally in accordance with the conventional spanning tree protocol as specified in the IEEE 802.1D Media Access Control ("MAC") Bridge standard, which is hereby incorporated by reference in its entirety. Entity 316 also includes additional, novel functions that improve the performance of the spanning tree protocol, as described below. In particular, spanning tree entity 316 is configured and arranged to rapidly re-start one or more of the spanning tree protocol instances 326 following a crash or failure.

FIGS. 4 and 7A–C are flow diagrams of the preferred methods for performing fast re-starts according to the present invention. As indicated at block 402 of FIG. 4, device 226 first performs its initial start-up or boot-up procedures in response to being activated. Next, the spanning tree entity 316 calculates the spanning tree and the state machine engine 328 transitions the ports 310 of device 226 in a conventional manner, as indicated at block 404. In particular, spanning tree entity 316 may learn which ports are active (e.g., up) and obtain their particular configuration from the interface manager 318 and system database manager 324, respectively. Entity 316 may then formulate BPDU messages 100 for forwarding from the active ports 310. In response to the information contained in BPDU messages received by entity 316 from neighboring devices, such as devices 222 and 224, entity 316 through engine 328 transitions the states of ports 310 among the blocked, listening, learning and forwarding spanning tree states.

It should be understood that entity 316 is preferably pre-configured with the number of spanning tree protocol instances 326 that are to be run at device 226. For example, some computer networks support virtual local area networks (VLANs). In VLAN compatible networks, various LANs, end stations, servers or network segments may be virtually segregated into a series of network groups by associating switch or other device ports with various VLAN designations. Suitable VLAN arrangements are described in the IEEE standard 802.1Q for Virtual Bridged Local Area Networks and in U.S. Pat. No. 5,394,402 to Ross for a HUB FOR SEGMENTED VIRTUAL LOCAL AREA NETWORK WITH SHARED MEDIA ACCESS. In VLAN compatible networks, a single spanning tree or active topology may be defined for the entire bridged network, including all VLAN designations.

Alternatively a separate spanning tree or active topology may be defined for each VLAN designation. That is, a separate instance of the spanning tree protocol may be defined and implemented for each VLAN designation. In a third alternative, as described in commonly owned U.S. patent application Ser. No. 08/997,297 filed Dec. 23, 1997 and entitled SHARED SPANNING TREE PROTOCOL, which is hereby incorporated by reference in its entirety, a plurality of spanning trees may be defined and shared among one or more VLAN designations. Thus, if entity 316 is configured to run a separate spanning tree per VLAN or to run shared spanning trees, then multiple spanning tree instances 326 are correspondingly established. Other arrangements may also be possible.

Entity 316 is also pre-configured with the type of spanning tree processes or protocols that are to be run. For example, in addition to the spanning tree protocol specified in the IEEE 802.1D standard, IBM developed its own spanning tree protocol for use with its Token Ring LAN intermediate devices. Similarly, Digital Equipment Corp. developed its own spanning tree protocol for use with its intermediate network devices. Although these alternative spanning tree protocols share many of the overall features and operating characteristics of the spanning tree protocol standardized by the IEEE, they each incorporate slight modifications, such as different destination MAC addresses for BPDU messages, different timers and timer values, additional BPDU message fields, etc. The present invention is compatible with all such types of spanning tree protocols.

For each instance 326 of the spanning tree protocol, entity 316 preferably creates a corresponding spanning instance data structure (DS) 334 that is stored at non-volatile memory 330, as indicated at block 406. Entity 316 may communicate with the system database manager 324 in a conventional manner to create each spanning instance DS 334. Entity 316 then loads the fields of spanning instance DS 334, as indicated at block 408, with spanning tree parameter information common to the respective instance 326 of the spanning tree protocol. That is, entity 316 may copy certain spanning tree parameter information, that is maintained in dynamic memory by the respective spanning tree protocol instances 326, to the spanning instance DS 334 at non-volatile memory 330.

Figure 5:
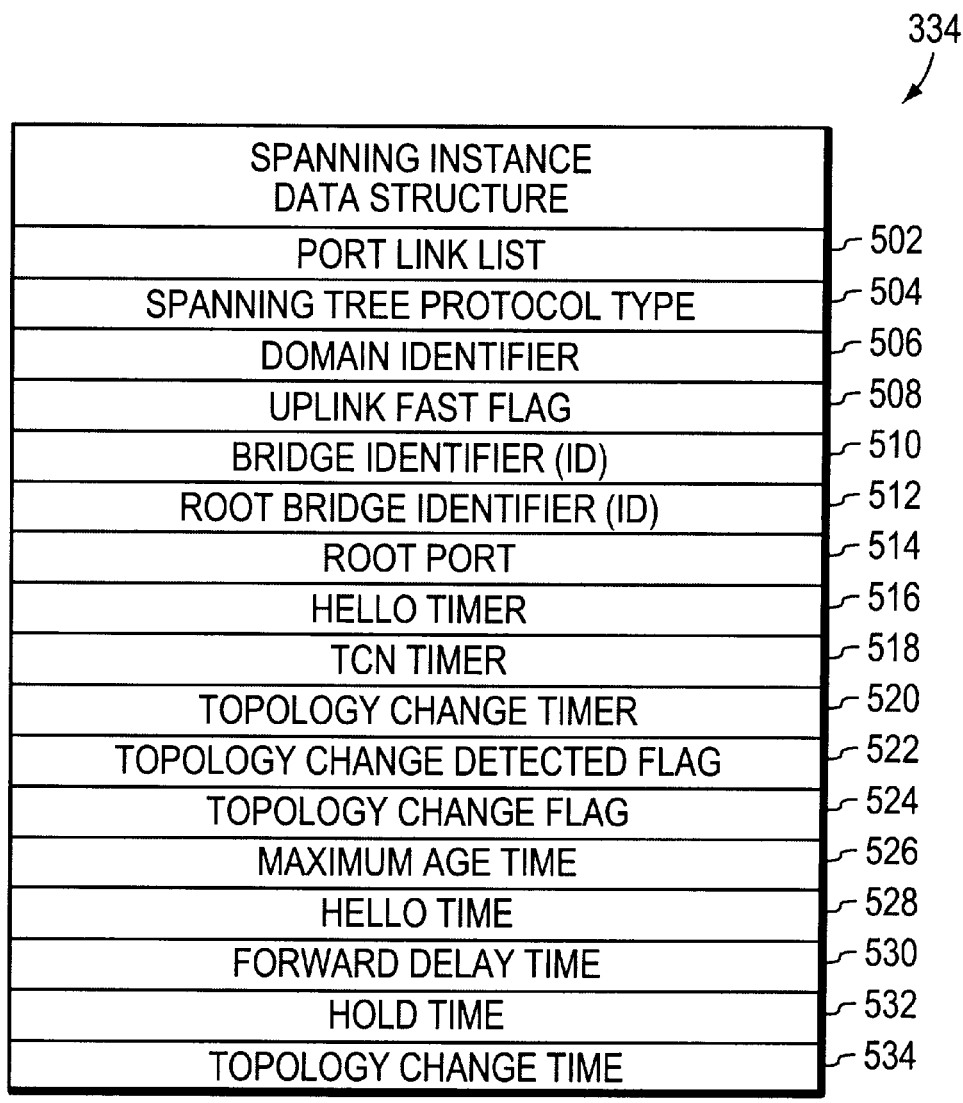
FIG. 5 is a highly schematic diagram of a preferred spanning instance data structure.

FIG. 5 is a schematic block diagram of a preferred spanning instance DS 334, which includes a plurality of data fields or records, for storing spanning tree parameter information. In particular, spanning instance DS 334 includes a spanning tree protocol type field 502 that identifies the particular type of spanning tree protocol (e.g., IEEE, IBM, DEC, Per VLAN Spanning Tree, Shared Spanning Tree, etc.). A domain identifier field 504 contains the name of the domain corresponding to this instance 326 of the spanning tree protocol. For example, in the one spanning tree per VLAN implementation, the domain name may correspond to the VLAN designation (e.g., red) associated with the respective instance of the spanning tree protocol. With shared spanning tree implementations, the domain name may be the corresponding primary VLAN designation. An uplink fast flag field 506 preferably includes a flag that is asserted if device 226 is configured to provide fast recovery of a failed root port, as described in commonly owned U.S. patent application Ser. No. 08/998,412 entitled, FAST RECONFIGURATION OF SPANNING TREES, which is hereby incorporated by reference in its entirety.

A bridge identifier (ID) field 508 contains the numeric identifier ascribed to device 226. A root bridge ID field 510 and a root port field 512 contain the numeric identifier of the elected root bridge in the bridged network and the root port at device 226, respectively, and a root path cost field 514 contains the lowest path cost to the root, as determined by entity 316 for this domain or instance 326 of the spanning tree protocol. For example, for a given domain or instance 326 of the spanning tree protocol, entity 316 may conclude that device 220 is the root and that its port number 3 (i.e., port 310c) provides the lowest path cost to device 220 and is thus its root port. Accordingly, entity 316 loads field 510 with the numeric bridge ID for device 220, field 512 with the numeric port identifier (e.g., 3) for its port 310c and field 514 with the path cost to device 220. For another instance 326 of the spanning tree protocol (and thus another spanning instance DS 334), entity 316 may conclude that device 222 is the root and that its port number 4 is its root port based on a lowest path cost to device 222. In this case, entity 316 loads fields 510, 512 and 514 of the respective spanning instance DS 334 with the corresponding information.

Figure 1:
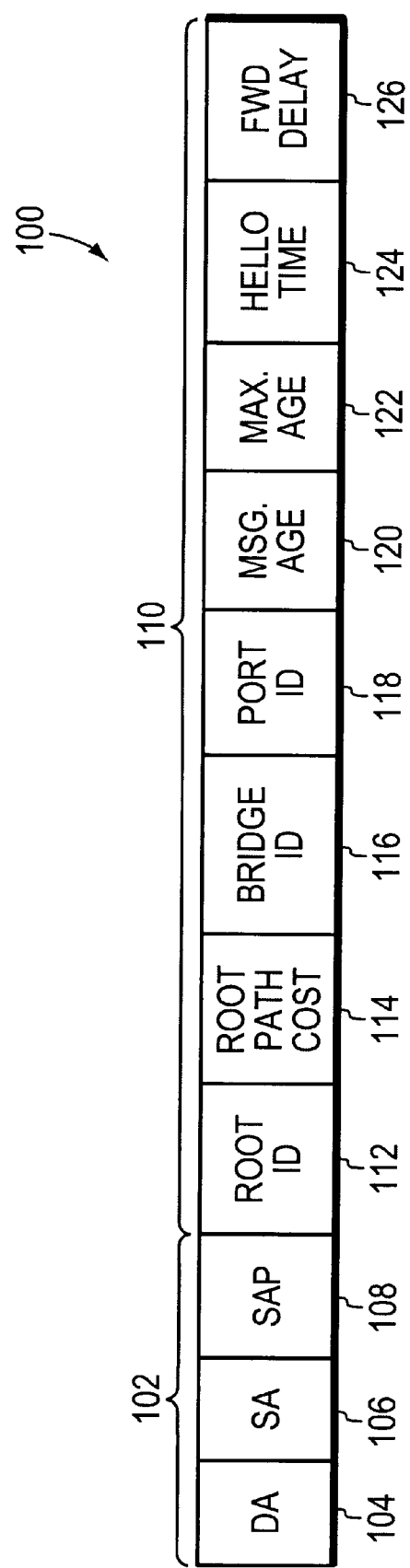
FIG. 1, previously discussed, is a block diagram of a conventional configuration bridge protocol data unit (BPDU) message.

A hello timer field 516 contains the hello time specified in the hello time field 124 (FIG. 1) of BPDU messages 100 originating from the root and associated with this instance 326 of the spanning tree protocol. A Topology Change Notification (TCN) Timer field 518 contains a timer which governs the rate at which entity 316 generates and sends TCN-PDU messages toward the root upon detecting a topology change (e.g., a port going from forwarding to blocked). A Topology Changer Timer field 520 similarly includes a timer, although this timer is used by entity 316 to determine how long it should continue to assert the TCN flag in BPDU messages sourced by entity 316 if it is elected to be the root. A Topology Change Detected Flag field 522 contains a flag that is asserted by entity 316 if it detects a change in the active topology for the respective instance of the spanning tree protocol. A Topology change flag field 524 contains a flag which is asserted if entity 316 is to assert the TCN flag in BPDU messages sourced by entity 316.

A maximum age time field 526, hello time field 528 and forward delay time field 530 preferably contain corresponding time parameters to be implemented by device 226 should it become the root for the respective instance 326 of the spanning tree protocol. A hold time field 532 specifies the minimum time between which test BPDU messages are to be sourced by entity 316 following a fast re-start, as described below. A Topology Change Time field 534 contains the amount of time for which the entity 316, if elected to be the root, asserts the TCN flag in BPDU messages following receipt of a TCN-PDU message. The value contained in field 534, moreover, is used to drive the timer of field 520.

Since the information in fields 502, 506, 508 and 526–534 of the spanning instance DSs 334 may already be stored in non-volatile memory 330 of device 226 as configuration data, one skilled in the art will recognize that this information need not be separately included in the spanning instance DSs 334.

Figure 4:
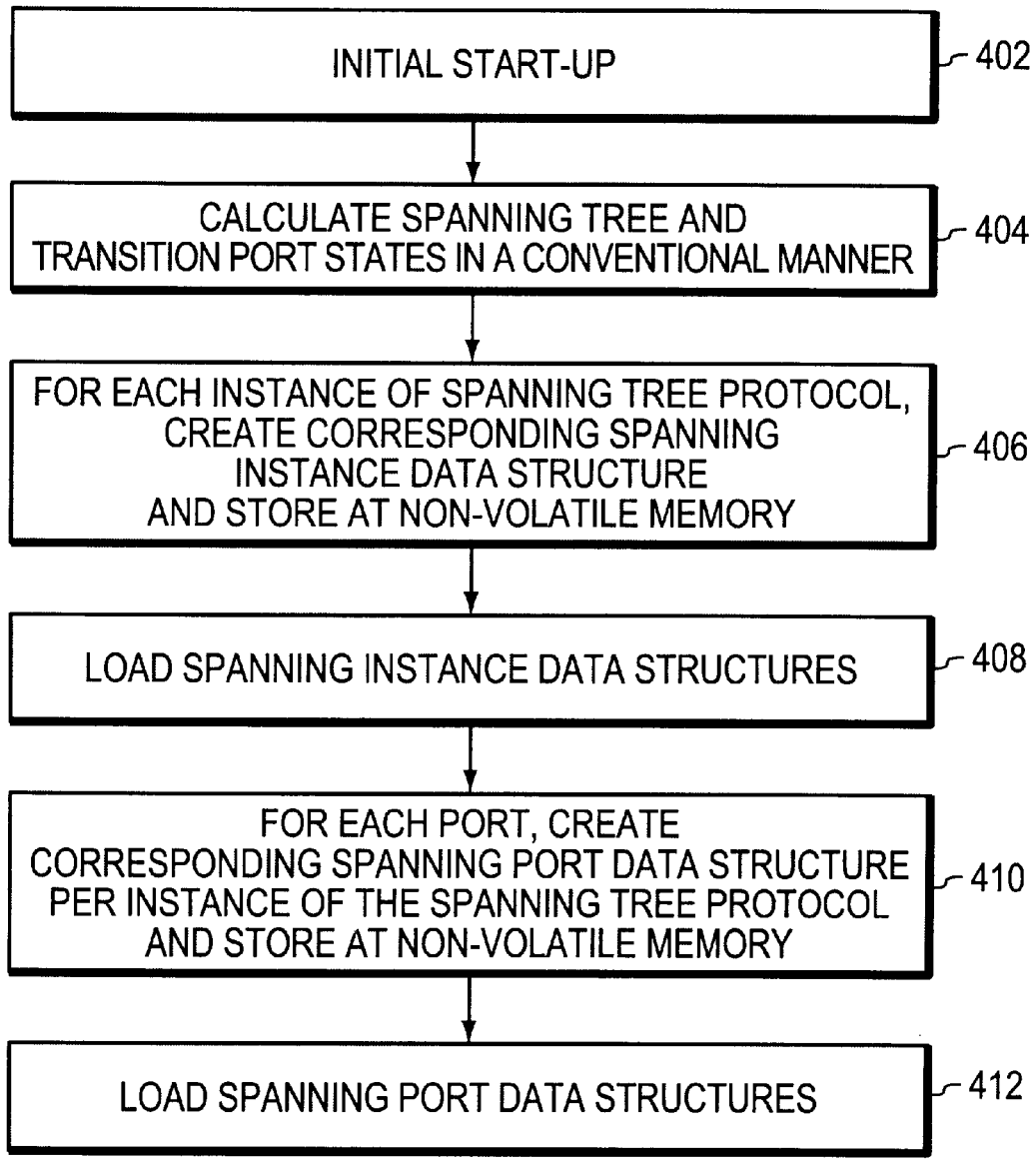
FIGS. 4 and 7A–7C are flow diagrams of the preferred methods of the present invention.

Entity 316 next creates a spanning port data structure (DS) 332 for each port 310 per spanning tree instance 326, as indicated at block 410 (FIG. 4). That is, for each instance 326 of the spanning tree protocol that is running at device 226, entity 316 creates a corresponding set of spanning port DSs 332 (one per port 310). Again, entity 316 may direct the system database manager 324 to create the spanning port DS 332 and store it at non-volatile memory 330. Each spanning port DS 332 also includes a plurality of data fields. As indicated at block 412, entity 316 also loads the data fields of the spanning port DSs 332, preferably from information maintained in dynamic memory by the spanning tree protocol instances 326. In general, each spanning port DS 332 contains spanning tree parameter information and port states for the respective port and spanning tree protocol instance 326.

FIG. 6 is a block diagram of a preferred spanning port DS 332. Spanning port DS 332 includes an interface handle 602, which may contain a handle for the layer 3 interface that is mapped to the layer 2 port (e.g., port 310*b*) for this spanning port DS 332. A handle is a well-known term referring to an identifying name or descriptor for some computer object or component. Entity 316 may utilize the handle as an index to find the spanning port DSs 332 during a fast re-start. In the preferred embodiment, the spanning port DSs 332 for each instance 326 are stored as linked lists in memory 330. Nonetheless, those skilled in the art will understand that other data structures or arrangements, such as tables, arrays, stacks, trees, ordinary lists, etc., may also be used.

Spanning port DS 332 also includes an interface/port physical state field 604 that contains the physical state of the port (e.g., link up/link down) as determined from the interface manager 318 in response to a query by entity 316. A spanning tree port state field 606 contains the spanning tree state of the respective port (e.g., disabled, blocking, listening, learning or forwarding) as specified by the state machine engine 328 in response to the calculation of the spanning tree at step 404. For example, entity 316 may conclude that it is the designated bridge for LAN 208 and that device 224 is the designated bridge for LAN 210 for a given instance of the spanning tree protocol. In response, entity 316 loads fields 606 of the spanning port DSs 332 for these ports (i.e., ports 1 and 5) with the blocking and forwarding states, respectively.

A port type field 608 contains the particular configuration of the respective port 310. For example, a port may be configured as a trunk port that is compatible with the IEEE 802.1Q standard and, therefore, messages forwarded from the port are encapsulated pursuant to the 802.1Q standard (e.g., they include a VLAN designation field). A port may alternatively be configured as a trunk port that is compatible with the Interswitch Link (ISL) mechanism from Cisco Systems, Inc., which defines a different encapsulation format. Alternatively, a port may be configured as an access port coupled to an Ethernet LAN and thus messages forwarded from the port are compliant with the Ethernet LAN standard. Those skilled in the art will understand that other port configurations are also possible. The configuration of various ports may be performed by the network administrator utilizing a management protocol, such as Simple Network Management Protocol (SNMP) or Cisco Works from Cisco Systems, Inc., either remotely or locally.

A designated bridge ID field 610 and a designated bridge port ID field 612 contain the numeric bridge ID and the numeric port ID, respectively, for the bridge and port that are currently understood to be the designated bridge and port for the LAN to which the port 310 associated with this spanning port DS 332 is coupled. Similarly, a designated bridge port root path cost field 614 contains the path cost from the designated bridge port to the root. For example, as described above, entity 316 may conclude that it (i.e., device 226) is the designated bridge for LAN 208 and that device 224 is the designated bridge for LAN 210. As a result, entity 316 loads fields 610 and 612 of the spanning port DS 332 that corresponds to port 1 (i.e., port 310*a*) with the numeric bridge ID for device 224 and the numeric port ID for the corresponding port at device 224, respectively. Entity 316 also loads field 614 with the path cost from the corresponding port at device 224 to the root. Entity 316 similarly loads fields 610 and 612 of the spanning port DS 332 for port 5 (i.e., port 310*e*) with its own numeric bridge ID and the numeric ID for its own port 5, respectively, and field 614 with the path cost from its port 5 to the root.

A BPDU message pending flag field 616 contains a flag that is asserted by entity 316 if a conventional BPDU message 100 is to be sent from this port upon expiration of a hold timer, as described below. A port priority field 618 contains the settable, numeric priority portion of the port ID for the port 310 that corresponds to this spanning port DS 332. Similarly, a port number field 620 contains the fixed numeric portion of the port ID. Preferably, the fixed numeric portion of the port ID is unique within the spanning tree domain or instance to which this spanning port DS 332 corresponds. A port path cost field 622 contains the port cost that is used to calculate the cost of reaching the root bridge from this port for the respective instance 326 of the spanning tree protocol.

A port fast flag field 624 contains a flag that is asserted by entity 316 if the respective port is configured to transition immediately to the forwarding state upon execution of the associated instance 326 of the spanning tree protocol, as described in commonly owned U.S. patent application Ser. No. 09/208,175 entitled VALUE-ADDED FEATURES FOR THE SPANNING TREE PROTOCOL, filed Dec. 9, 1998, which is hereby incorporated by reference in its entirety. A hold timer field 626 contains a timer which, if running, specifies the minimum elapsed time between transmission of BPDU messages to prevent a device from overwhelming its neighbors with BPDU messages. A maximum age timer field 628 also contains a timer that is used to discard stale BPDU information in a conventional manner. A forward delay timer field 630 contains another timer which is used by entity 316 and state machine engine 328 in moving the respective port between the listening, learning and forwarding states. Spanning port DS 332 may also include one or more fields which can be used for maintaining statistical data. For example, fields 632 and 634 can be used to maintain a running count of BPDU messages sent and received, respectively, by the given port.

Those skilled in the art will understand that either the spanning instance DS 332 or the spanning port DS 334 may include a greater or fewer number of data fields and thus contain more or less spanning tree parameter information. It should be understood that for operation of the fast re-start method of the present invention, each spanning instance DS 334 preferably includes at least fields 504, 510, 512 and 514 (i.e., domain, root ID, root port and root path cost). Similarly, each spanning port DS 332 preferably includes at least fields 606, 610, 612 and 614 (i.e., port state, designated bridge ID, designated bridge port and the designated bridge port's root path cost). Furthermore, the spanning port DSs 332 may be dynamically optimized depending on the information being stored therein. For example, where a device is the designated bridge for a given LAN, then fields 610 and 508 will contain the same information. Accordingly, field 610 may be omitted (or point to field 508), thereby conserving memory resources. Those skilled in the art will recognize that other such optimizations may also be performed.

In addition, as various instances 326 of the spanning tree protocol are re-calculated during normal operation of device 226, entity 316 preferably up-dates the contents of the spanning instance DSs 334 and spanning port DSs 332, as required. For example, in response to device failures or additions within the network 200, ports 310 at device 226 may transition from blocking to forwarding and vice versa. In response, entity 316 up-dates the contents of the spanning tree port state field 612 of the spanning port DS 332 for the affected ports 310. It should be understood that entity 316 may begin loading and up-dating the fields of the spanning instance DSs 334 and spanning port DSs 332 as soon as it starts running the spanning tree protocol rather than waiting for the respective spanning trees to converge.

As described above, device 226 and/or one or more instances 326 of the spanning tree protocol may crash or fail at any time. With conventional execution of the spanning tree protocol, it generally takes thirty seconds to re-calculate the spanning tree protocol and transition the appropriate ports to the forwarding state upon recovering from such crashes or failures. This delay can seriously affect the delivery and transmission of certain network traffic flows, especially audio and video streams. With the present invention, entity 316 is able to re-start the failed or crashed instances 326 of the spanning tree protocol in significantly less time, thereby reducing if not avoiding message transmission delays.

Figure 7A:
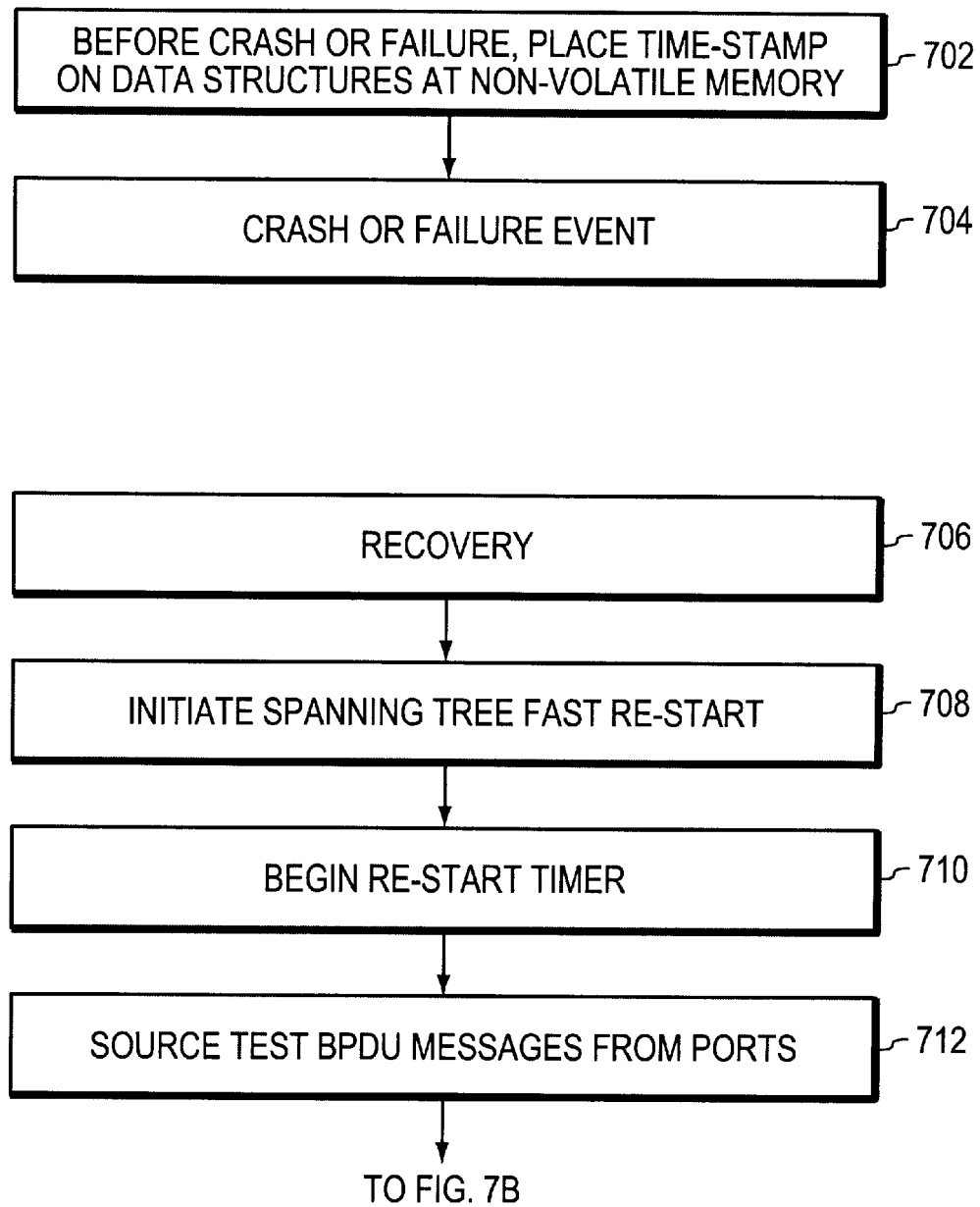
Figure 7B:
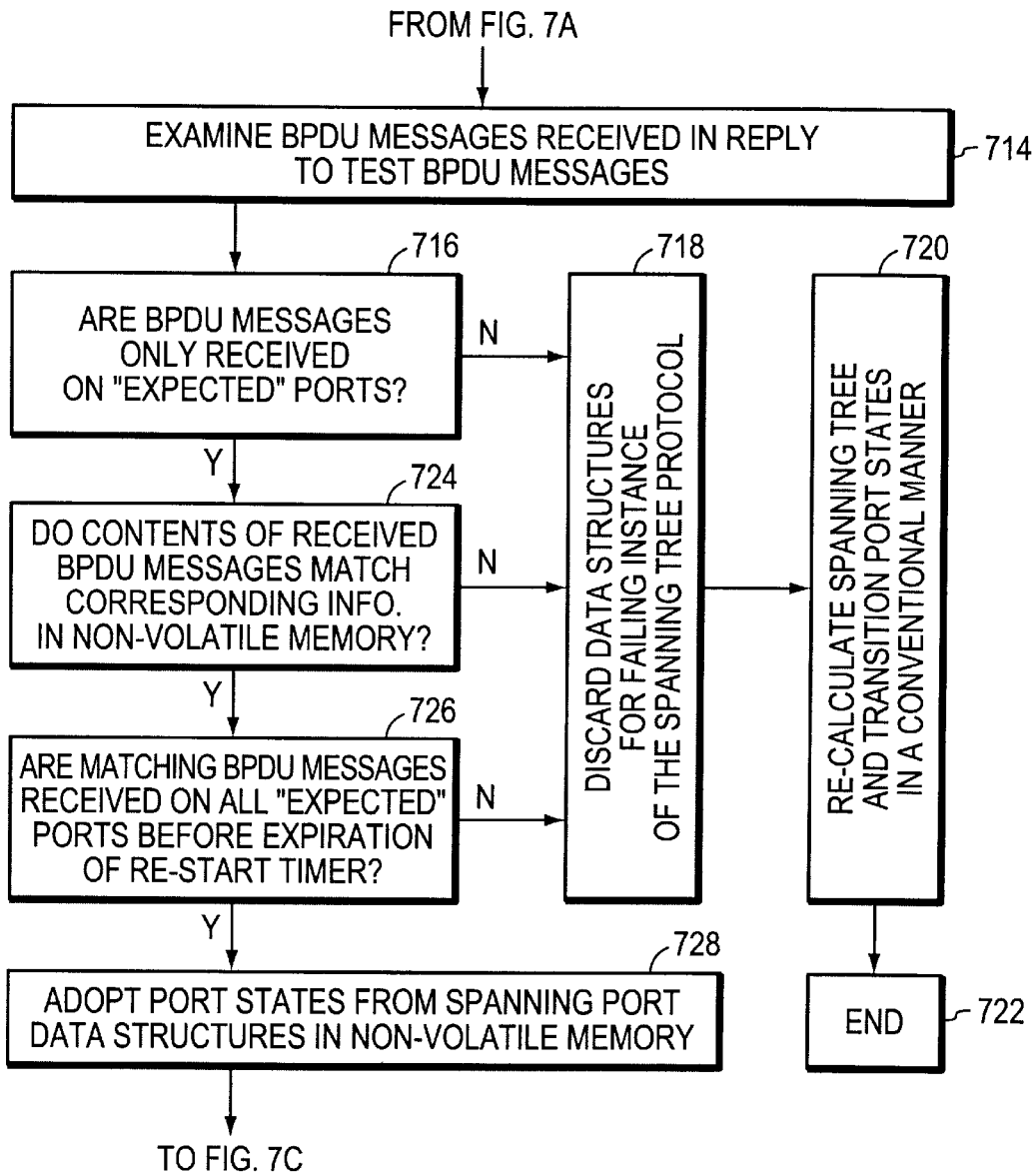

Referring to FIG. 7A, before a crash or failure of device 226, entity 316 and/or of one or more instances 326 of the spanning tree protocol, entity 316, as one of its last pre-crash acts, places a time-stamp at non-volatile memory 330, as indicated at block 702. In particular, if device 226 or entity 316 is about to crash, entity 316 preferably places a time stamp in all of the spanning port DSs 332 and spanning instance DSs 334. If only one or more instances 326 of the spanning tree protocol are about to crash, entity 316 preferably only places a time stamp in the spanning port DSs 332 and spanning instance DSs 334 corresponding to those instances 326 of the spanning tree protocol about to crash. Device 226, entity 316 and/or one or more instances 326 of the spanning tree protocol then crashes or fails, as indicated at block 704.

At some point after the crash or failure event of block 704, the crashed or failed device or component will recover, as indicated at block 706. In response, entity 316 initiates a fast re-start of the spanning tree, as indicated at block 708. In particular, entity 316 initiates a re-start timer, as indicated at block 710. As described below, entity 316 utilizes the re-start timer as an outer temporal bound on the completion of certain tasks during fast re-start of the spanning tree. The re-start timer may be controlled by the timer manager 322 and entity 316 may communicate with time manager 322 in a conventional manner to initiate the re-start timer. Next, entity 316 generates test BPDU messages for forwarding from ports 310, as indicated at block 712.

The test BPDU messages generally have the same format as conventional BPDU message 100. Entity 316, moreover, assumes itself to be the root for each instance 326 of the spanning tree that is being re-started and loads the corresponding test BPDU messages accordingly. That is, entity 316 loads the numeric bridge ID for device 226 in the root ID field 112 (FIG. 1) of all test BPDU messages. The test BPDU messages are then passed to the forwarding entity 320 for forwarding from each port 310. It should be understood that, if any ports are disabled, then test BPDU messages are neither generated for nor forwarded from such disabled ports. Test BPDU messages are sent at the rate specified in hold time field 532 (FIG. 5), which is preferably set at 500 milliseconds. The test BPDU messages will be received at all neighboring devices. Referring to FIG. 2, test BPDU messages from device 226 will be conveyed by trunks 228 and LANs 208 and 210, and received at devices 220, 222 and 224.

In accordance with conventional operation of the spanning tree protocol, devices 220, 222 and 224 may or may not respond to the test BPDU messages from device 226, depending on the spanning tree states of their own ports. More specifically, as provided in the IEEE 802.1D standard and as described in R. Perlman, Interconnections: Bridges and Routers at pp. 54–62 (1992), bridges reply to received BPDU messages with their own BPDU messages if a BPDU message is received on a port that is in the listening, learning or forwarding states and the received BPDU message contains "inferior" information compared with the information maintained for the port on which it was received. No replies are made to BPDU messages received on blocked ports even if the received BPDU message contains "inferior" information. Thus, from the point of view of recovered device 226, it should only receive reply BPDU messages on its root port and blocked ports. To the extent, device 226 is a designated bridge for a given LAN (e.g., LAN 208), it should not receive reply BPDU messages on the respective port (e.g., port 5), because the ports of the other bridges (e.g., device 222) coupled to this LAN are blocking and thus precluded from sending BPDU messages.

Continuing with the above example, assume that port 3 of device 226 is its root port (with device 220 being the root), ports 1, 2 and 4 are blocking and ports 5 and 6 are forwarding for a given instance 326 of the spanning tree protocol. Assuming no change has taken place in the active topology and thus the port states at devices 220, 222 and 224 have not changed, BPDU messages should be received at device 226 in reply to its test BPDU messages on ports 1–4 and not ports 5 and 6.

The received BPDU messages are examined by entity 316, as indicated at block 714 (FIG. 7A). More specifically, the received BPDU messages may be captured by the frame transmission and reception objects 312, provided to the forwarding entity 320 and passed to the spanning tree entity 316. According to the invention, entity 316 performs a series of checks on the received BPDU messages to determine whether a fast re-start of the spanning tree protocol is appropriate. As indicated at block 716 (FIG. 7A), entity 316 determines whether the BPDU messages received in reply to its test BPDU messages 100 are only received on the expected ports (e.g., ports 1–4). Entity 316 knows on which ports to expect reply BPDU messages by examining the root port fields 512 of the spanning instance DSs 334 and the port state fields 606 of the spanning port DSs 332 at memory 330.

If a BPDU message 100 is received on a non-expected port (e.g., port 5), then entity 316 knows that a change in the active topology has taken place while it was down. That is, the port at device 222 that is coupled to LAN 208 has, for whatever reason, concluded that it should be forwarding and thus responded to the test BPDU from device 226. Accordingly, the information in non-volatile memory 330 for this instance of the spanning tree protocol 326 is stale and, in response, it is discarded by entity 316, as indicated at block 718. As a result, entity 316 proceeds to re-calculate the spanning tree and transition its port states in a conventional manner, as indicated at block 720. That is, entity 316, through state machine engine 328, places its non-disabled ports in the listening state, sources conventional BPDU messages 100 from its ports and transitions its port states in response to the information in received BPDU messages, if any, in a conventional manner. This completes the process as indicated at end block 722.

If in response to its test BPDU messages, device 226 only receives reply BPDU messages on its expected ports, entity 316 compares the contents of the received BPDU messages with the spanning tree parameter information stored in non-volatile memory 330, as indicated at block 724. In particular, for a blocked port (e.g., port 1) coupled to a LAN (e.g., LAN 210) utilizing another device as its designated bridge (e.g., device 224), entity 316 determines whether the root path cost, bridge ID and port ID in fields 114, 116 and 118 of the BPDU message 100 received at this port match the corresponding information in fields 610, 612 and 614 of the spanning port DS 332 for this port (e.g., port 1) and spanning tree instance. For its root port (e.g., port 3), entity 316 determines whether the root ID and root path cost in fields 112 and 114 of the BPDU message received at this port match the corresponding information in fields 510 and 512 of the spanning instance DS 334. Entity 316 further determines whether this BPDU message 100 was received on the port (e.g., port 3) identified in root port field 512 of the spanning instance DS 334. If any of the spanning tree parameter information in the received BPDU messages (e.g., root ID, root path cost, designated bridge ID, designated bridge port ID, root path cost from the designated bridge port, etc.) does not match the corresponding information in non-volatile memory 330, entity 316 knows that a change in the active topology has occurred that may affect the spanning tree states of its ports. Accordingly, entity 316 discards the information in the non-volatile memory 330 and proceeds to re-calculate the spanning tree in a conventional manner, as indicated at blocks 718, 720 and 722, as described above.

In addition to comparing the contents of received BPDU messages 100 with the corresponding spanning tree parameter information in the spanning port and spanning instance DSs 332, 334 at non-volatile memory 330, entity 316 also determines whether matching BPDU messages 100 have been received on each of the expected ports before expiration of the re-start timer, as indicated at block 726. As mentioned above, assuming that the crash at device 226 was not yet detected by the neighboring devices and thus they have not modified their port states, device 226 should receive BPDU messages 100 on its root and blocked ports per instance of the spanning tree protocol in reply to its test BPDU messages. If device 226 fails to receive a reply BPDU message 100 on one of these expected ports by the time the re-start timer expires, entity 316 preferably discards the corresponding information in non-volatile storage, as indicated at block 718, and proceeds to re-calculate the spanning tree in a conventional manner, as indicated at block 720.

The re-start timer is preferably set to 2 seconds, although those skilled in the art will understand that other values may be used.

If the response to each of the three steps 718, 724 and 726 is in the affirmative, then entity 316 "knows" that it has recovered before its neighboring devices detected any failure. Entity 316 also "knows" that the spanning tree port states from non-volatile memory 330 is still valid. Accordingly, entity 316 preferably adopts the port states from field 608 of the spanning port DSs 332 at non-volatile memory 330, as indicated at block 728. That is, state machine engine 328 immediately returns the spanning tree states of ports 310 at device 226 to the state specified in field 608 of the respective spanning port DSs 332. For example, if the spanning port DS 332 corresponding to port 310a for a given instance of the spanning tree protocol indicates that port 310a was in the forwarding state prior to the crash, state machine engine 328 immediately returns the spanning tree state of port 310a to forwarding upon reaching step 728. Entity 316 does not transition port 310a through either the listening or learning states. Accordingly, forwarding entity 320 may be begin sending and receiving messages on port 310a immediately.

As shown, with the present invention, entity 316 is able to determine whether a change is warranted in the spanning tree states of its ports following its recovery from a crash or failure. If no change is warranted, entity 316 is able to by-pass the time consuming requirements of executing the conventional spanning tree protocol and, instead, immediately return its ports to their original states just prior to the crash or failure. As a result, network 200 does not experience the delays normally associated with conventional running of the spanning tree protocol.

It should be understood that the performance of steps 716, 724 and 726 by entity 316 preferably occurs simultaneously. It should be further understood that as soon as steps 716, 724 and 726 are satisfied, entity 316 may adopt the stored port states from memory 330.

It should also be understood that the non-volatile memory 330 and/or data structures 332, 334 may be remotely located from device 226. In this embodiment, entity 316 would retrieve the contents of the data structures 332, 334 from the remote site upon re-starting the spanning tree protocol and proceed as described above.

It should be further understood that entity 316 preferably performs the fast re-start procedures of the present invention separately for each recovered instance of the spanning tree protocol 326. Thus, entity 316 may determine that one or more instances spanning tree protocol instances 326 may be rapidly re-started while others must be re-calculated in a conventional manner.

Figure 7C:
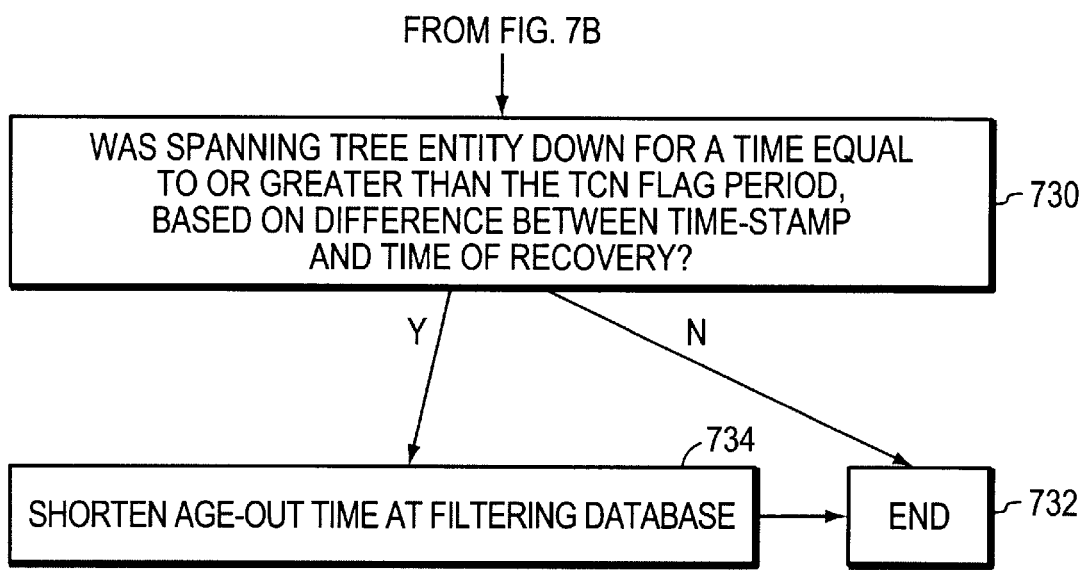

In a further aspect of the invention, entity 316 also determines whether the address information in filtering database 336 may have become stale while device 226 and/or entity 316 was down. More specifically, entity 316 determines the length of time that it or the respective instance(s) 326 of the spanning tree protocol were down by comparing the time stamp at non-volatile memory 330 with the current time, as indicated at block 730 (FIG. 7C). As described above in connection with step 702 (FIG. 7A), entity 316 preferably places a time stamp in the non-volatile memory 330 just before it crashes. Upon recovery, entity 316 compares the time stamp stored at memory 330 with the current time to determine how long entity 316 and/or one or more instances 326 of the spanning tree protocol were down. Entity 316 further determines whether it was down longer than the time that the TCN flag in BPDU messages from the root would remain asserted following a topology change somewhere in the network 200. As described above, upon receiving a TCN-PDU, a root bridge will assert the TCN flag in subsequent BPDU messages that it generates to alert the other devices in the network 200. In response, the other devices shorten the age-out time associated with their filtering databases. The root bridge, moreover, continues to assert the TCN flag for a fixed period. At the end of this period, BPDU messages from the root no longer have the TCN flag asserted.

If entity 316 determines from step 730 that it was down for longer than the period in which the TCN flag would be set by the root bridge, entity 316 "knows" that it may have completely missed a topology change. That is, the root may have started and stopped asserting the TCN flag in its BPDU messages while device 226 was down. In response, entity 316 preferably shortens the age-out time for the filtering database 336, as indicated at block 734. That is, in this case, entity 316 assumes that a topology change has taken place and causes the forwarding entity 320 to quickly discard the contents of its filtering database 336. If entity 316 determines at step 730 that it was not down longer than the time that the TCN flag would remain asserted, then it "knows" that it has not missed any topology changes. In this case, the fast re-start procedure ends, as indicated at block 732.

The foregoing description has been directed to specific embodiments of this invention. It will be apparent, however, that other variations and modifications may be made to the described embodiments, with the attainment of some or all of their advantages. For example, those skilled in the art will understand that a single data structure may be created and stored for each instance of the spanning tree protocol that includes the requisite information from the spanning instance and spanning port data structures. Alternatively, a single data structure may be created and stored for all instances of the spanning tree protocol at the intermediate device. Therefore, it is the object of the appended claims to cover all such variations and modifications as come within the true spirit and scope of the invention.

What is claimed is:

1. In an intermediate network device having a non-volatile memory, a plurality of ports and at least one spanning tree state machine engine configured to transition the ports among a plurality of spanning tree port states, a method for re-starting a spanning tree protocol, the method comprising the steps of:

storing spanning tree parameter information and spanning tree port states for the ports in the non-volatile memory;

in response to a re-start of the spanning tree protocol, generating and sending test Bridge Protocol Data Unit (BPDU) messages from the ports so as to cause one or more BPDU messages to be received at the intermediate device;

comparing information in the received BPDU messages with the spanning tree parameter information stored at the non-volatile memory; and adopting the spanning tree port states from the non-volatile memory provided that the information in the received BPDU messages matches the spanning tree parameter information in the non-volatile memory.

2. The method of claim 1 wherein a first port is elected as a root port and the method of adopting is further in response to the step of determining whether BPDU messages are received only on the root port and ports for which the spanning tree port state is blocking.

3. The method of claim 2 wherein the adopting step is further in response to the steps of:

initiating a re-start timer upon the re-start of the spanning tree protocol;

determining whether at least one BPDU message is received on the root port and the ports for which the spanning tree port state is blocking before expiration of the re-start timer.

4. The method of claim 3 wherein the step of storing includes storing a first numeric identifier associated with a root bridge elected for a given spanning tree protocol.

5. The method of claim 4 wherein the step of comparing includes comparing information regarding a root bridge contained BPDU messages received, on the root port with the first numeric identifier.

6. The method of claim 5 wherein, for a given port coupled to a designated bridge port of a designated bridge, the step of storing includes storing a second numeric identifier associated with the designated bridge and a third numeric identifier associated with the designated bridge port.

7. The method of claim 6 wherein the step of comparing includes comparing information regarding the designated bridge and the designated bridge port contained in received BPDU messages with the second and third numeric identifiers.

8. The method of claim 7 further comprising the steps of:

discarding the spanning tree port states in the non-volatile memory provided that the information in the received BPDU messages fails to match the spanning tree parameter information in the non-volatile memory; and re-calculating the spanning tree protocol.

9. The method of claim 8 further comprising the steps of;

discarding the spanning tree port states in the non-volatile memory provided that one or more BPDU messages are received on other than the root port and ports for which the spanning tree port state is blocking; and re-calculating the spanning tree protocol.

10. The method of claim 9 further comprising the steps of:

discarding the spanning tree port states in the non-volatile memory provided that no BPDU messages are received on one of the root port and the ports for which the spanning tree port state is blocking before expiration of the re-start timer; and re-calculating the spanning tree protocol.

11. The method of claim 2 further comprising the steps of:

discarding the spanning tree port states in the non-volatile memory where one or more BPDU messages are received on other than the stored root port and ports for which the stored spanning tree port state is blocking; and re-calculating the spanning tree protocol.

12. The method of claim 1 wherein the step of storing includes storing a first numeric identifier associated with a root bridge elected for a given instance of the spanning tree protocol.

13. The method of claim 1 further comprising the steps of:

discarding the spanning tree port states in the non-volatile memory where the information in the received BPDU messages fails to match the spanning tree parameter information in the non-volatile memory; and re-calculating the spanning tree protocol.

14. An intermediate network device for use in forwarding messages in a computer network through a plurality of ports, the intermediate network device comprising:

a non-volatile memory; and a spanning tree entity operatively coupled to the non-volatile memory, the spanning tree entity configured to execute at least one spanning tree protocol to transition one or more ports among a plurality of spanning tree port states, wherein the spanning tree entity stores spanning tree parameter information and the spanning tree port states for the ports in the non-volatile, memory, and further wherein the spanning tree entity is configured to examine the spanning tree parameter information stored at the non-volatile memory in response to a recovery from a failure so as to determine whether the port states are valid.

15. The intermediate network device of claim 14 wherein the spanning tree entity is further configured to generate and send one or more test Bridge Protocol Data Unit (BPDU) messages from at least one port upon recovering from the failure so as to trigger the receipt of BPDU messages from neighboring devices.

16. The intermediate network device of claim 14 wherein the spanning tree entity is further configured to generate and send one or more test Bridge Protocol Data Unit (BPDU) messages from all non-disabled ports upon recovering from the failure so as to trigger the receipt of BPDU messages from neighboring devices.

17. The intermediate network device of claim 15 wherein the spanning tree entity is further configured to determine whether the spanning tree parameters from the BPDU messages received from the neighboring devices matches the spanning tree parameter information stored at the non-volatile memory.

18. The intermediate network device of claim 15 wherein the spanning tree parameter information stored in the non-volatile memory includes spanning tree port states, the spanning tree entity determines that the spanning tree parameter information stored at the non-volatile memory is valid where the BPDU messages received from the neighboring devices are received only on the stored root port and on the ports for which the stored spanning tree port state is blocking, and the contents of the BPDU messages received at the ports matches the information stored in the non-volatile memory for the respective ports.

19. The intermediate network device of claim 15 wherein the spanning tree parameter information stored in the non-volatile memory includes spanning tree port states, and the spanning tree entity adopts the spanning tree port states stored in the non-volatile memory if the spanning tree parameter information is determined to be valid.

20. The intermediate network device of claim 12 wherein the spanning tree entity determines that the spanning tree parameter information stored at the non-volatile memory is invalid where at least one of (1) one or more BPDU messages are received from the neighboring devices on a stored designated port and (2) the contents of one or more received BPDU messages does not match the information stored in the non-volatile memory for the respective port.

21. A computer readable medium containing executable program instructions for re-starting a spanning tree protocol configured to transition one or more ports of an intermediate network device among a plurality of spanning tree port states, the executable program instructions comprising program instructions for:

storing spanning tree parameter information and spanning tree port states for the ports in the non-volatile memory;

in response to a re-start of the spanning tree protocol, generating and sending test Bridge Protocol Data Unit (BPDU) messages from the ports so as to cause one or more BPDU messages to be received at the intermediate device;

comparing information in the received BPDU messages with the spanning tree parameter information stored at the non-volatile memory; and adopting the spanning tree port states from the non-volatile memory provided that the information in the received BPDU messages matches the spanning tree parameter information in the non-volatile memory.

22. The computer readable medium of claim 21 wherein the intermediate network device includes a filtering database having entries associated with an age-out time, the medium further comprising executable program instructions for:

storing a time-stamp in the non-volatile memory before the spanning tree protocol one of fails and crashes;

upon re-starting of the spanning tree protocol, comparing the current time to the time-stamp stored at the non-volatile memory; and if the difference between the current time and the time-stamp stored in the non-volatile memory equals or exceeds a Topology Change Notification (TCN) flag set value, shortening the age-out time associated with the entries of the filtering database.

23. The computer readable medium of claim 22 further comprising executable program instructions for leaving the age-out time associated with the entries of the filtering database unmodified, if the difference between the current time and the time-stamp stored in the non-volatile memory is less than the TCN flag set value.

24. The computer readable medium of claim 21 wherein the executable program instructions for adopting comprise program instructions for assigning the port states stored in the non-volatile memory to the ports of the intermediate network device, such that a port assigned a forwarding state begins forwarding network messages immediately.

25. The computer readable memory of claim 21 wherein the executable program instructions for comparing comprise program instructions for comparing the spanning tree parameters contained in a BPDU message received on a given port with the spanning tree parameter information stored in the non-volatile memory for the given port.

26. The computer readable memory of claim 21 further comprising executable program instructions for:

commencing a re-start timer either before or at the time of issuance of the test BPDU messages; and determining whether the BPDU messages received by the intermediate network device are received before expiration of the re-start timer.

* * * * *